(12) United States Patent
Kaiser et al.

(10) Patent No.: US 8,383,556 B1
(45) Date of Patent: Feb. 26, 2013

(54) HIGH CARRYING CAPACITY TEMPERATURE-STABLE BREAKABLE GEL FOR WELL DRILLING, COMPLETION, AND OTHER USES

(76) Inventors: Conard E. Kaiser, Houston, TX (US); Beverly A. Kaiser, legal representative, Houston, TX (US); Jock R. Collins, Houston, TX (US); James R. Collins, Houston, TX (US)

( * ) Notice: Subject to any disclaimer, the term of this patent is extended or adjusted under 35 U.S.C. 154(b) by 0 days.

(21) Appl. No.: 13/251,245

(22) Filed: Oct. 1, 2011

Related U.S. Application Data

(63) Continuation-in-part of application No. 11/983,455, filed on Nov. 8, 2007, now abandoned.

(60) Provisional application No. 60/858,225, filed on Nov. 8, 2006.

(51) Int. Cl.
*C09K 8/12* (2006.01)
*C09K 8/528* (2006.01)
*C09K 8/64* (2006.01)

(52) U.S. Cl. ............... 507/119; 507/224; 507/238

(58) Field of Classification Search ......... 507/119, 507/224, 239
See application file for complete search history.

(56) References Cited

U.S. PATENT DOCUMENTS

| | | | |
|---|---|---|---|
| 4,711,731 A * | 12/1987 | Garvey et al. | 507/119 |
| 5,846,454 A * | 12/1998 | Koczo et al. | 516/11 |
| 6,201,050 B1 | 3/2001 | Kaiser et al. | |
| 6,211,296 B1 * | 4/2001 | Frate et al. | 525/207 |
| 6,528,563 B2 | 3/2003 | Kaiser et al. | |
| 6,794,340 B2 | 9/2004 | Nguyen et al. | |
| 6,838,418 B2 | 1/2005 | Allan et al. | |
| 7,082,995 B2 | 8/2006 | Hanes, Jr. et al. | |
| 2002/0065359 A1 * | 5/2002 | Allan et al. | 524/556 |
| 2005/0227874 A1 * | 10/2005 | Berger et al. | 507/211 |

OTHER PUBLICATIONS

Application of Carbopol to controlled release preparations I. Carbopol as a novel coating material, Muramatsu et. al, International Journal of Pharmaceutics, 2000, p. 77-83.*

* cited by examiner

*Primary Examiner* — Ling Choi
*Assistant Examiner* — Aiqun Li
(74) *Attorney, Agent, or Firm* — Kenneth A. Roddy

(57) ABSTRACT

A high carrying capacity temperature-stable breakable gel of selectable viscosity with exceptional lubricity and high-temperature stability for varied use as a carrier of solids and particulate matter, as well as semi-solids and liquids in water and petroleum well drilling, completion and production such as gravel pack fluid, drilling fluid, fracturing fluid, pigging fluid, sweep for coiled tubing, and other uses. A preferred formulation comprises a formulated "Base Concentrate" which is added to water or drilling fluids to be viscosified and an "Activator" which is added in amounts to develop the desired gel consistency. When breaking of the gel is desired a "Breaker" composition containing multivalent ions collapses the gel into a free-flowing liquid.

11 Claims, No Drawings

HIGH CARRYING CAPACITY TEMPERATURE-STABLE BREAKABLE GEL FOR WELL DRILLING, COMPLETION, AND OTHER USES

CROSS REFERENCE TO RELATED APPLICATION

This application is a Continuation-In-Part of and claims priority of U.S. patent application Ser. No. 11/983,455, filed Nov. 8, 2007, now abandoned which claimed priority of U.S. Provisional Application Ser. No. 60/858,225, filed Nov. 8, 2006.

BACKGROUND OF THE INVENTION

1. Field of the Invention

This invention relates generally to carriers and viscosifiers, and more particularly to a high carrying capacity temperature-stable breakable gel of selectable viscosity capable of performing as efficient carriers of solids and particulate matter, as well as semi-solids and liquids.

2. Background Art

Rheological agents, thickening mediums with many applications, have long been used. Virtually any purpose that is enhanced by water losing some of its free-flowing characteristics is a candidate for the utilization of thickening agents or viscosifiers.

Hundreds of U.S. Patents have been granted for thickened water and hydrocarbons in the form of guar, cellulose and its derivatives, resins, polysaccharides, starches, oleaginous fluids, amine oxides, styrenes, organic phosphate esters, polymers cross-linked with many products including amines, zirconium, and titanium based cross-linkers, boron and ester forming compounds, and combinations and derivatives of all of these. Fracturing products also include tackifying compounds to coat proppants, fibrous materials, magnetized materials, and single to multiple configurations of proppants with even those composed of both man-made products and natural materials, even peanut hulls. Gel breakers have been patented including temperature and alkali metal breakers, enzyme breakers, staged breakers, multiple breakers, encapsulated breakers, quaternary ammonium halide salts, and other compounds are commonly used not only as well drilling and fracturing fluids but also as masks in textile and carpet printing to screen-off those areas from applied dyes.

Hand lotions, shampoos and cosmetics are commonly no more than thickened water which becomes a carrier for desired additives. Fire fighting and prevention are greatly enhanced by the use of thickened or gelled water. Most of these applications are rather straightforward in their utilization of thickened waters; thicken the water either before or after the addition of the desired additives with the result being ready for the intended use. However the need for the elimination of the thickening is desirous in many instances.

Since water has insufficient viscosity and carrying capacity to efficiently suspend heavier particulates and other matter to be moved, transported, or stored, additives of many kinds have long been used to increase water-use efficiency in petroleum and water well drilling, workover, completion and distribution. Materials such as cuttings and debris, including sand, must be carried out of boreholes during drilling and completion processes. Additionally, increased viscosity water has long been used to carry various additives and other matter into and out of wells including solids such as sand and gravel; these are used to increase drilling efficiency and production output. Similar suspension products are also useful for distribution and storage.

Water thickening agents have long been known to those skilled in the art. In well drilling for example, the addition of desired materials allow thickened water to be used for blowout prevention and as lubricants for the drill string but they serve many other uses. They are additionally used as viscosifiers, rheological agents and carriers for propping agents (proppants) used in well fracturing, particulates such as gravel packs, and other materials including, but not limited to, GILSONITE® (a naturally occurring hydrocarbon resin that is similar in appearance to coal or hard asphalt), sulfonated asphalts, graphite, surfactants and other materials which may serve as lubricants, for diversion agents, and for plugging fine holes in the strata such as shale, thus controlling fluid "spurt" and thief zone loss. Currently viscosity-increasing agents are also added to water so that it will effectively function as a particulate carrier as well as a carrier for additives that prevent clay swelling, and a myriad of other complications associated with drilling, completion, production and distribution. Viscosifying agents include conventional linear gels such as guar gums and derivatives including, but not limited to carboxymethylhydroxypropyl guar, hydroxypropyl guar, carboxymethyl guar, xanthates, many cellulose formulations such as hydroxyethyl cellulose (HEC), and carboxymethylhydroxyethyl cellulose, hydrolyzed polyacrylamide, polysaccharides, and other compositions together commonly collectively referred to as viscosifiers.

Guar and cellulose type viscosifiers are relatively slow to reach their effective viscosity and are notorious for being virtually unusable in cold water. Most require the use of hot water if they are to be rapidly and efficiently dissolved. Following their slow hydration and the resultant maximum thickening of these previous art viscosifiers, they are still lacking in their ability to support and efficiently carry cuttings or other materials, especially during a pause or cessation of fluid movement whatever the cause. In such cases, entrained matter often settles due to failure of carrier support and suspension capacity. This can result in tremendous time and economic loss.

Typical viscosifiers of prior art are particularly susceptible to the boycott effect which compromises their sag or carrying capacity in deviated wells, particularly in horizontal boreholes. The resultant accumulations may block the well or cause seizure of the drill stem especially in deviated wells such as horizontal boreholes where particulate accumulation is notorious for causing drill stem seizure and loss of wells. Likewise in distribution, particulates may settle to the bottoms of pipelines, and shipping and storage containers. In all uses, high carrying capacity without excessive viscosity is vital because higher viscosity without carrying capacity results only in higher pressures being required for product movement.

Guar, xanthane, cellulose and their derivatives and similar based carriers may change viscosity as they progress down hole. Increased temperatures, dilution, and the presence of other materials often compromise such carriers causing failure. The addition of significantly more carrier may be required to maintain the desired viscosity if the returns are to be recirculated. Almost all of the above noted carriers are subject to failure at even mild temperature increases commonly encountered in drilling to any significant depth. Virtually all such materials lose as much as 60% efficiency with as little as 400° F. rise in downhole temperature commonly experienced.

Viscosifying agents are commonly used to formulate carriers of various proppants used in attempts to establish permanent porosity in fractured strata and maintain openings in the pore throats. The use of many types of viscosifiers is currently being phased out of use because of the difficulty or impossibility of removing them after they have served their transport purpose and also because of their toxicity and possible aquifer and groundwater contamination Removal of additives such as viscosifiers, commonly referred to as "formation healing," is vital. After serving their intended purpose, the inherent carrier residue of the linear gels such as the guar and cellulose type is often difficult, and frequently impossible, to remove. They effectively bond to strata and many commonly used proppants, especially silica based materials. Their viscosity can be decreased by further dilution with large quantities of water, which aids in their removal. Injection of enzyme breakers is helpful but results are usually slow and frequently meet with limited effect. The residual carriers are subject to microbial action, which adds further complications. Ineffective removal and subsequent accumulation of prior art viscosifiers commonly spawns the occlusion of the very fractures and pores into which they were purposely injected to open. Prior to the present invention, these were commonly difficult to impossible to clean up. Carrier component accumulation commonly compromises fluid flow and therefore production efficiency.

Cross-linked gels do not invade the formation as deeply as linear gels, but they do develop a very concentrated buildup near the fracture face. Carrier presence may contribute to the tendency for sand and gravel to pack and accumulate, thus forming viscosifier reinforced "sand bridges" which can occlude casing, tubing, and/or flow lines primarily because they are so difficult to remove.

In water well drilling, the injection of carriers containing toxic or other agents deleterious to health may require lengthy flushing of the well before the produced water may be utilized. Many are virtually impossible to remove. Many jurisdictions have already banned the use of such.

Not only are some organic viscosifiers difficult to remove from the subterranean strata, when returned to the surface, many of these organic additives such as the guars may have significant negative environmental impact. They must be disposed of properly creating permit, handling and transportation problems, especially when used offshore.

Even with their limited effectiveness and many drawbacks, the guar (and guar derivatives), and HEC type viscosifiers are commonly used as sweeps and carriers; they are economical to use and, until the present invention, there has been nothing better with which to replace them.

Our commonly-owned previous patent, Kaiser et al, U.S. Pat. No. 6,201,050, which is hereby incorporated by reference herein in its entirety, discloses a viscous breakable gel additive carrier for mixing with ion containing materials, including dry powder based and calciferous materials, which in its uniform homogeneous gel form, prevents separation and settling of the additives prior to mixing, and upon mixing with the ion containing materials liquefies and becomes totally and evenly miscible to allow easy and precise mixing. The gel includes formulations of selected additives thoroughly mixed with a cross-linked polyacrylic acid gelling agent, an organic chelating agent, and an alkaline electrolyte to produce uniform homogeneous mortars, grouts, stuccos and other compositions. The present invention is distinguished over the previous patent and provides a different formulation of constituents that enhance well drilling, completion and production operations and other uses while greatly increasing the efficiency of the process and significantly lowering cost.

Our commonly-owned previous patent, Kaiser et al, U.S. Pat. No. 6,528,563, which is hereby incorporated by reference herein in its entirety, discloses multi-use homogeneous breakable gelled adhesives and adhesive mastics which can be used "as is" for the installation of various types of tile, including tiles with deeply grooved backs, stone, marble, and other floor and wall coverings, flexible sheet goods, carpet and other uses, and can be mixed with a Portland cement powder to form a powerful latex-modified mortar having the added utility of a crack suppressive adhesive and functioning as a waterproofing membrane. The stabilized gelled adhesive or adhesive mastic prevents the separation and settling of components, and when Portland powdered cement is added, becomes a high strength latex modified mortar. The gelled adhesive or adhesive mastic is usable as a latex modified dry-set mortar. With the addition of Portland cement and silica sand, the gel will break and become a free-flowing liquid with additives which allow precise quantitation and easy mixing to produce a homogeneous latex modified thinset mortar that assumes the texture of a trowelable thinset mortar as more Portland cement/silica sand is added. The present invention is distinguished over the previous patent and provides a different formulation of constituents that enhance well drilling, completion and production operations and other uses while greatly increasing the efficiency of the process and significantly lowering cost.

Nguyen et al, U.S. Pat. No. 6,794,340 discloses a method for removing drill cuttings from wellbores and drilling fluids using a reversible cross-linkable polymer and an encapsulated crosslink activator which delays the cross-linking. It is submitted that any downhole residual materials from the preferred polysaccharide polymer formulations taught by Nguyen et al that are not returned to the surface during the wash or sweep processes will leave significant deposits in the pore throats and interstices of the adjacent subterranean strata. Commonly referred to as "snot," this material may be difficult or impossible to remove even with repeated flushing of the strata. The present invention, on the other hand, does not require encapsulation and the gel when mixed with the breaker produces virtual instantaneous liquefaction, or breaking, of the final gel into a free-flowing liquid.

Allan et al, U.S. Pat. No. 6,838,418 discloses a fracturing fluid comprising polar base, 0.1-5.0% of a mid or lower molecular weight (about 500,000) polyacrylate, an activator for ionizing the polyacrylate to a hygroscopic state, and a breaker in an amount of 0.1-1.0% wt, wherein the breaker is NaCl or KCl. The polyacrylate is a polyacrylic acid polymer cross linked with polyalkenyl ethers or di-vinyl glycol. The breaker is preferably encapsulated to allow it to be transported to the fracture site easily, and the fluid is emulsified by adding liquid Carbon dioxide $CO_2$ or $N_2$ and a surfactant under high pressure to the fluid stream near the wellhead.

Unlike the Allen et al patent, the base concentrate of the present invention comprises a mixture of from about 80% to about 91.8% by weight of a buffered water solution containing acidic and alkaline ions and having a pH above about pH 3, and from about 0.4% to about 16.24% of a polyacrylate; and a second or activator solution containing a mixture of water, an amine cross-linking agent, and a nonionic surfactant. The cross-linking agent in the activator preferably comprises diisopropanolamine, and the breaker material comprises ammonium persulfate, although calcium chloride, sodium chloride, or potassium chloride may also be used. The present invention, uses more effective multi-valent ions for breaking, is cross linked with different chemicals, requires no encapsulation of the breaker, and no emulsification or surfactants are required. The present invention also provides acid/base buffering molecules that compensate for significant swings in other components and/or additives required or unknowingly present as constituents of the source water. It also enhances the speed of mixing subsequent additions, decreases the quantities of ingredients required, and provides for more rapid and cleaner breaking of the gel when desired while leaving no gel residue.

One of the major problems encountered in well fracturing is that the water used is typically from a source other than municipal water supplies and therefore is of limited uniformity. The source water may be high in natural salts and chlorides such as calcium and its salts, as well as magnesium, potassium, etc. Whether single ions or large particulates, the type and quantities of dissolved solids in the source water are critical to successful fracturing, The source water may also commonly be stockpiled in "roll-off" boxes, which are large containers, brought to each well site to store the massive quantities of liquids, gels, etc. to be used during the completion process. Fracturing alone may require availability of even 4,000,000 gallons water/gel/etc. often pumped into the well in a matter of minutes. Commonly 8'×10'×42' carbon steel "boxes" with a capacity to 500 barrels are used. These containers are usually leased, brought to each site as needed, and then quickly moved on to the next drill site. Each "roll-off" box is different, much depending on prior use. The interior of the container may not have been cleaned well after its last use thus may contain high or low pH residuals or other contaminants. The interior may also be rusty and therefore be a source of iron complexes, i.e. rust, which may prevent gel formation or break or liquify stored gel. Another factor affecting the water used in well fracturing is that the transportation equipment including tanker trucks, high and low pressure pump trucks, and other hauling and handling devices may be contaminated with composition altering contaminants.

Unlike many prior art well fracturing formulations, the present invention overcomes problems with the source water by utilizing a combination of acid and alkaline electrolytes and an amine crosslinking agent that are formulated in ratios within a particular critical range which not only serves to elevate the pH of the source water, but also provides acid/base buffering molecules which are essential to attain effective and consistent results vital to effective gel formation and maintenance in field use. This feature produces a buffering solution that compensates for significant swings in other components and/or additives required or unknowingly present as constituents of the source water and achieves superior results that are incapable of being achieved by percentage ranges that are taught by prior art formulations. It also enhances the speed of mixing the subsequent additions, decreases the quantities of ingredients required, and provides for more rapid and cleaner breaking of the gel when desired while leaving no gel residue. In some cases, depending on the source water makeup, simply significantly increasing the quantity of "Base Concentrate" and "Activator" utilized in the mixture (described hereinafter) will provide desired gelling.

SUMMARY OF THE INVENTION

The present invention overcomes the aforementioned problems and is distinguished over the prior art in general, and these patents in particular by a breakable selective viscosity water-based gelled carrier that has excellent particulate suspension and transport characteristics with exceptional lubricity and high-temperature stability for varied use including: water and petroleum well drilling, completion and production such as gravel pack fluid, drilling fluid, fracturing fluid, pigging fluid, sweep for coiled tubing, etc.

As a packaged product, the present invention is preferably utilized as a two-part system comprising a "Base Concentrate" and an "Activator". The "Base Concentrate" comprises a mixture of from about 80% to about 91.8% by weight of a buffered water solution containing acidic and alkaline ions and having a pH above about pH 3. If a water source of indeterminate pH is used in producing the "Base Concentrate", about 0.1% to about 4.25% by weight of an acid is added to the source water to lower the pH below about pH 2 and form an acid/water mixture; and then about 0.3% to about 0.8% by weight of an alkaline electrolyte is added to raise the pH of said water/acid mixture above about pH 3 and form the buffered water solution; thereby providing moderating molecules thus forming advantageous buffering that broadens the latitude of compensation for possible source water contamination while increasing the efficiency of manufacture by dramatically lowering required mixing time, increasing the ease of mixing. Then a cross-linkable polymer, preferably a polyacrylate, is added in a quantity sufficient to make the viscosity of the "Base Concentrate" gel convenient for shipping and handling. If site source water is sufficiently pure, Base Concentrate buffering may not be required.

An alternate very highly concentrated oil-continuous colloidal formulation "Slurry Base Concentrate" contains polymer levels unachievable in polar solvent formulations such as water. The high levels of dispersed polymer powder cannot hydrate in an "oil-external emulsion" thereby providing a stable highly "Base" which increases shipping and handling efficiency while greatly lowering costs. The polymer slurry "Base" provides for far less volume and weight shipments, is easier to handle, requires no special equipment, and most importantly, the polymer powder cannot hydrate during storage thus eliminating the problem of the polymer in water thickening to the point that it can no longer be pumped or poured. The "Slurry Base Concentrate" is thixotropic so that it appears to be in a stable form at rest but becomes fluid when agitated so it is easily handled in the field yet allowing no premature/undesired hydration of the entrapped polymer.

The "Activator" is produced by adding alkaline electrolytes, such as sodium hydroxide, to water to raise the pH, and the pH of the "Activator" mix may be further raised by addition of a cross-linking agent, preferably an amine such as diisopropanolamine, followed by the addition of an ionic surfactant to bring the mixture to the desired shipping and handling viscosity. The "Activator" is mixed well and utilized on-site as to stimulate the production dilution of the "Base Concentrate" to instantaneously trigger formation of a high carrying capacity temperature-stable breakable gel having high-temperature stability and lubricating characteristics and a viscosity sufficient to support, suspend, and carry solids, particulate matter, semi-solids, proppants, and liquids therein into subterranean formations during drilling, fracturing, completion and production operations.

A "Breaker" material may be added and mixed with the gel, if or when breaking of the gel to a liquid is desired. The "Breaker" material contains polyvalent dry cations or aqueous cation solutions, which, upon contact with the gel, breaks the gel into a free-flowing liquid thereby releasing the supported, suspended, and carried solids, particulate matter, semi-solids, proppants, and liquids therefrom to maintain the integrity of fractures in the subterranean well formation strata. A preferred "Breaker" material is ammonium persulfate, however, calcium chloride, sodium chloride, or potassium chloride may also be used as a "Breaker" material.

Because the gel can be produced to a preferred viscosity, or broken, on site as desired, yet upon breaking, becomes fluid leaving no detectable residue, the present invention also has many other uses such as a masking agent in textile and carpet printing, paper manufacturing, binder aids, cosmetics, electronics manufacture, froth floatation in the mining industry, drift control aids for aerial spraying, and in foods and pharmaceuticals.

One of the significant features and advantages of the present invention is that it overcomes problems with a source water by utilizing a combination of acid and alkaline electrolytes and an amine crosslinking agent that are formulated in ratios within a particular critical range which not only serves to elevate the pH of the source water, but also produces a buffering solution that provides acid/base buffering molecules that compensate for significant swings in other components and/or additives required or unknowingly present as constituents of the source water.

Another significant feature and advantage of the present invention is that it utilizes a combination of acid and alkaline electrolytes and an amine crosslinking agent that are formulated in ratios within a particular critical range to attain effective and consistent results vital to effective gel formation and maintenance in field use.

Another feature and advantage of the present high carrying capacity elevated temperature resistant breakable gel is that it enhances the speed of mixing subsequent additions of constituents, decreases the quantities of ingredients required, and provides for more rapid and cleaner breaking of the gel when desired while leaving no gel residue upon breaking.

Another feature and advantage of the present invention is that it provides a breakable gel carrier that will produce a desired viscosity homogeneous gel within seconds of mixing with water as opposed to guar, cellulose and similar viscosifiers that often require many minutes, hours, or more to hydrate to a desired viscosity homogeneous gel.

Another feature and advantage of the present invention is that it provides a breakable gel carrier that is easily formulated on-site using cold water to almost instantly produce a desired viscosity homogeneous gel, and does not require for the use of hot water. Upon mixing, a higher viscosity gel results more rapidly in cold water than in warm or hot water, whereas in cold water, guar, xanthane, cellulose and similar viscosifiers will usually require far more time to produce a gel, if at all.

Another feature and advantage of the present invention is that it provides a breakable gel carrier that can be shipped in ultra-concentrate allowing later water addition, therefore granting substantial savings in shipping costs.

Another feature and advantage of the present invention is that it provides a breakable gel carrier that is compatible with most additives.

Another feature and advantage of the present invention is that it provides a breakable gel carrier that will leave no occlusive or contaminating residues following breaking and liquefaction.

Another feature and advantage of the present invention is that it provides a breakable gel carrier that can be instantaneously gelled as desired yet can be formulated to delay gelling with the high support, suspend, carry, and lubricity characteristics. When pumped, a delay may be useful to negate the necessity of using higher-pressure positive displacement pumps that would be required to handle high viscosity materials.

Another feature and advantage of the present invention is that it provides a breakable gel carrier that does not require an on-site hydration unit and tanks to prepare it for use.

Another feature and advantage of the present invention is that it provides a desired viscosity breakable gel carrier concentrate that pours easily without significant lipping providing for easy and accurate measurement in the field.

Another feature and advantage of the present invention is that it provides a breakable gel carrier that is safe and easy to use with currently available on-site equipment.

Another feature and advantage of the present invention is that it provides a breakable gel carrier that has high temperature stability.

Another feature and advantage of the present invention is that it provides a breakable gel carrier that is efficient in far less concentrations than guar, cellulose and other currently used formulations. Viscosity refers to the "thickness" of the fluid, not its carrying capacity. Prior art guars, cellulose derivatives, etc. viscosifiers, unless formulated in high concentrations, heavier particulates readily settle out, whereas, with the present invention, sand or gravel can stay suspended for days, weeks or more if desired, yet they will immediately settle out when the gel is broken.

Another feature and advantage of the present invention is that it provides a breakable gel carrier that has a molecular affinity for silicates in its gelled form yet, upon breaking, has no more molecular attraction for silicates than plain water.

Another feature and advantage of the present invention is that it provides a breakable gel carrier that is effective as a sweep or carrier of cuttings, debris or other matter out of wells during the drilling process yet is easily broken to a free-flowing liquid, thus providing for simplified removal of these returned solids.

Another feature and advantage of the present invention is that it provides a breakable gel carrier that is an efficient carrier of solid particles and other desired additives. It is exceptional for carrying suspended particulates into hydraulically produced subterranean fissures while in its gelled form yet, upon contact with ionic matter such as calcium ions, becomes liquid water so it does not have to be washed or flushed from the voids of established pathways.

Another feature and advantage of the present invention is that it provides a breakable gel carrier that may be used for injection especially into sand producing formations to seal off their high permeability thief zones, or as diverting agents to alter the geometry of a fluid channel.

Another feature and advantage of the present invention is that it provides a breakable gel carrier that may be injected into established streams, and is especially useful as a carrier for coal slurry, bituminous oil sands and similar products through pipelines and support in storage.

Another feature and advantage of the present invention is that it provides a variable viscosity breakable gel carrier for heavier additives including those to be injected into wells as sweeps to lift particulates to be removed from a well.

A further feature and advantage of the present invention is that it provides a variable viscosity breakable gel carrier for many additives including those that are to be injected into wells and will efficiently carry solid particle proppants such as gravel and sand into the hydraulically induced subterranean fractures produced upon injection, and can be easily and completely liquefied.

A still further feature and advantage of the present invention is that it provides a variable viscosity breakable gel carrier formulation that can be formulated from solid, powder or liquid raw materials on-site using currently available technology thus eliminating the need to transport large quantities of aqueous core formulations.

Other features and advantages of the invention will become apparent from time to time throughout the specification and claims as hereinafter related.

DESCRIPTION OF THE PREFERRED EMBODIMENTS

The following examples describe various formulations of a gelled carrier for manufacturing and other uses including, but not limited to, injection and use in water, oil and gas wells, and which can be instantaneously liquefied or broken by the application of a breaker component that breaks the gel so it becomes free flowing liquid. It should be understood that detailed embodiments of the formulations hereafter disclosed are merely exemplary of the present invention and not all inclusive and sequence of mixing of ingredients and amounts thereof may be varied. The specific details disclosed herein are not to be interpreted as limiting but rather as a basis for the claims and as a representative basis for teaching one skilled in the art to variously practice the invention.

However used, the final formulation usually comprises the combination of concentrates further diluted with water just prior to use. It is typically shipped in two concentrates. A formulated "Base Concentrate" is added to water to be viscosified; the resultant core dilution is typically then held in storage and circulated therein. Forceful injection of the Base Concentrate into the on-site water source is usually sufficient to insure proper mixing although agitation is recommended. When used, an "Activator" is then added in amounts sufficient to develop the desired gel consistency. When breaking of the gel is desired, the simple contact of the gel with a "Breaker" composition containing the proper ions collapses the gel into a free-flowing liquid.

When used on well locations with the proper equipment available, as is commonplace with current technological advances, the entire process may be accomplished by on-site mixing the raw components or premixes thereof, "on-the-fly", using a combination of operator or computer controlled component addition, metering, mixing and use. This greatly increases economy of effort and enhances the delivery of the product of the present invention.

The Base Concentrate in a Two-Part System

In one example, a "Base Concentrate" comprises a mixture of from about 80% to about 91.8% by weight of a buffered water solution containing acidic and alkaline ions and having a pH above about pH 3. If a water source of indeterminate pH is used in producing the "Base Concentrate", an acid such as, but not limited to, an organic acid such as a carboxylic acid or an inorganic acid such as hydrochloric acid is mixed into the source water in sufficient quantity, usually about 0.1% to about 4.25% by weight, to lower the acidity of the mix below about pH 2. The amount of such acid necessary is primarily dependent on the characteristics and mineralization of the source water, especially its pH. To this acid/water mixture is added an alkaline electrolyte such as, but not limited to, sodium hydroxide, in sufficient quantity, usually about 0.02% to about 2.8% by weight, to raise the pH of the water/acid mixture above about pH 3 and form the buffered water solution. To this mixture is added and thoroughly mixed about 0% to about 16.24% by weight, of a cross-linkable polymer, such as, but not limited to, a polyacrylate in a quantity sufficient to make the viscosity of the "Base Concentrate" gel convenient for shipping and handling. The strength of the formulated Base Concentrate can be greatly varied thereby modifying the "at the point of use" percentage of the Activator required. The Activator solution contains a mixture of water, an amine cross-linking agent, preferably an amine such as, but not limited to, diisopropanolamine, and a nonionic surfactant which is then added for further viscosity adjustment. The base concentrate and the activator solution are mixed together in a ratio of from about 93% to about 99.95% by weight of base concentrate to about 0.05% to about 7% by weight of activator solution to raise the pH of the base concentrate and instantaneously trigger formation of a high carrying capacity temperature-stable breakable gel having high-temperature stability and lubricating characteristics and a viscosity sufficient to support, suspend, and carry solids, particulate matter, semi-solids, proppants, and liquids therein into subterranean a well formation during drilling, fracturing, completion and production operations.

The "Base Concentrate" Liquid Formulation

The following is a typical example of a formulation to produce the "base" liquid mixture:

| CONSTITUENT | QUANTITY BY WEIGHT |
| --- | --- |
| Plain Water | From about 80% to about 91.8% |
| Inorganic or organic acid, if necessary | From about 0.01% to about 4.25%, sufficient to lower the water pH to below about 2, quantity most dependent on source water pH and mineral content |
| NaOH (or other alkaline), if necessary | From about 0.03% to about 0.8%, sufficient to raise the water pH to above about 3 |
| Cross-linkable polymer | From about 0% to about 17% |

In another example, an alternate "Slurry Base Concentrate" oil-continuous colloidal formulation, sometimes referred to as a colloidal emulsion, or simply emulsion, comprises a mixture of from about 57% to about 94% by weight of a high-purity refined drilling fluid base oil free of benzene, toluene, ethylbenzene and xylene (BTEX), and about 6% to about 43% of a polyacrylate. The "Slurry Base Concentrate" may be prepared by using high shear mixing technology to dry-auger the polyacrylate powder into the high-purity refined drilling fluid base. The strength of the formulated Slurry Base Concentrate can be greatly varied thereby modifying the percentage of the Activator required at the point of use. A stable breakable gel is produced by mixing about 0.15% to 8% of this "Slurry Base Concentrate" into water and adding the "Activator" containing a cross-linking agent, preferably an amine such as, but not limited to, diisopropanolamine. The base concentrate and activator solution are mixed in a ratio of from about 0.15% to about 8.0% by weight of base concentrate to about 92% to about 99.85% by weight of activator solution to instantaneously trigger formation of a high carrying capacity temperature-stable breakable gel having high-temperature stability and lubricating characteristics and a viscosity sufficient to support, suspend, and carry solids, particulate matter, semi-solids, proppants, and liquids therein into subterranean a well formation during drilling, fracturing, completion and production operations.

The term "BTEX" is an acronym well-known to those skilled in the art that stands for benzene, toluene, ethylbenzene, and xylenes. These compounds are some of the volatile organic compounds (VOCs) found in petroleum derivatives and are notorious due to the contamination of soil and groundwater with these compounds.

A "Slurry Base Concentrate" permits formulations with polymer levels unachievable in polar solvent formulations such as water, i.e. the high levels of polymer powder cannot hydrate in the oil thereby providing a stable highly concentrated "Base" which greatly decreases shipping and handling costs. The polymer slurry "Base" provides for far less volume and weight shipments, is easier to handle, requires no special equipment, and most importantly, the polymer powder cannot hydrate during storage thus eliminating the problem of the polymer in water thickening to the point that it can no longer be pumped or poured. The "Slurry Base Concentrate" is thixotropic so that it appears to be in a stable form at rest but becomes fluid when agitated so it is easily handled in the field while allowing no premature/undesired hydration of the entrapped polymer.

Alternative "Slurry Base Concentrate" Formulation

The following is a typical example of a formulation to produce the "base" liquid mixture in an oil-external emulsion:

| CONSTITUENT | QUANTITY BY WEIGHT |
| --- | --- |
| Refined drilling fluid base non-BTEX oil | From about 57% to about 94% |
| Cross-linkable polymer powder | From about 6% to about 43% |

The "Activator" Formulation

The following is a typical example of an "Activator" which is added to the "Base Concentrate" liquid at the point of use to increase the final gel viscosity:

| CONSTITUENT | QUANTITY BY WEIGHT |
| --- | --- |
| NaOH 10% in water | From about 40% to about 100% |
| Cross-linking agent such as Diisopropanolamine | From about 0% to about 55% |
| Nonionic Surfactant such as an alcohol ethoxylate, if desired | From about 0% to about 17% |

The "Breaker" Material

The "Breaker" material contains polyvalent dry cations or aqueous cation solutions, which when applied to the gel in the amount of about 0.00027% to about 2.73% by weight produces virtual instantaneous liquefaction, or "breaking", of the gel into a free-flowing liquid. A preferred "Breaker" material is ammonium persulfate, however, calcium chloride, sodium chloride, or potassium chloride may also be used.

The breakable gel is particularly suited for use as a carrier for many additives including those that are to be injected into wells and will efficiently suspend, and carry solids, particulate matter, semi-solids, and solid particle proppants such as gravel and sand into hydraulically induced subterranean fractures produced upon injection, and can be easily and completely liquefied. For example, when the "Breaker" is utilized, it breaks the gel into a free-flowing liquid thereby releasing the supported, suspended, and carried solids, particulate matter, semi-solids, proppants, and liquids therefrom to maintain the integrity of fractures in the subterranean well formation strata.

Initially, in the acid environment of the Base Concentrate, even after the addition of some alkaline electrolytes, the polyacrylic acid remains tightly coiled so that there is no resultant detectable viscosity increase. As alkaline electrolytes are added, the supplied hydroxyl groups attach to the polymers. When sufficient hydroxyl groups have attached, the polymer molecules begin to form long straight chains. Being similarly charged, attaching hydroxyls in close proximity along the molecule repel each other compelling the tightly coiled high molecular weight polymer chains to uncoil and straighten. The rapid formation of lengthy polymer chains mechanically interfering with all movement, results in an almost instant increase in viscosity thereby producing a gel. The gelled water thus formed has greater carrying capacity than viscosifiers such as guars and similar viscosifiers, whose viscosity is dependent only on long molecular chains interfering with each other—they are stable but not particularly strong.

At this point a small amount of a cross-linking agent, preferably an amine such as, but not limited to, diisopropanolamine, is added to further elevate the pH and, far more importantly, cross-link the long straightened polymer chains forming a molecular lattice. Preferably the viscosity of the gel is desirably kept low for ease of handling. Later it is to be further activated at the use site by the addition of more pH elevators and cross-linkers in combination with desired surfactants.

When the "Activator", comprising water, additional alkaline electrolytes, and possibly more cross-linking agents as desired to which may be added one or more, preferably nonionic surfactants, is mixed with the on-site production dilution of the "Base Concentrate", the end result is a high lubricity strong high carrying capacity gel. Ease of use is enhanced and far less pressure is required to move the load carrying breakable gel of the present invention even though it can carry much higher loads.

If combined, the double cross-linked molecules in the present invention are bound together by both covalent atomic bonds between the cross-linked polyacrylates and also by interwoven surfactant molecules which make the particulate carrying capacity much higher than either alone.

With prior art guar and cellulose-type viscosifiers, carrying capacity is dependent on long strands of very high viscosity material rich in hydroxyl groups which slowly hydrate therefore the requirement for long hydration time usually requiring a hydration unit at the use site. When added to water, the result is a slow gain in viscosity by the building of very long molecular chains interfering with each other. Additional strength is also derived from hydrogen bonding. Hydrogen bonds act to hold the strands together much like a weak cross-linking agent. Thus they increase viscosity but, since the strands are not strongly cross-linked or bound together, the carrying capacity is limited for it is dependent on the presence of sufficient numbers of molecules and weak hydrogen bonding. For that reason, stiff high viscosity guars, HEC and the like are required for efficient particle carrying capacity. Often very specialized pumps capable of producing very high pressures are required to move these highly viscous materials if particle carrying capacity is desired.

In the present invention, the gel results from the high strength of the strong double-bonded molecular web plus the inherent viscosity due to the presence of the long molecular chains themselves. Particulates are thus more easily supported in the 3-dimensional ion bound molecular web of the present invention than the much weaker hydrogen bonds of guars, etc. The suspended particulates simply do not generate enough force to break the chemical (ionic) bonds and thus stay suspended (until those ionic bonds are broken upon the addition of gel breaking ions).

Prior art viscosifiers formed with guars, HEC and the like are also occlusive and difficult to remove thus making formation healing problematical. Washing, flushing and adding enzymes and persulfates are methods used in attempts to remove such products after they have served their intended purpose. Commonly, partial or complete plugging by their residuals occurs.

Prior art hydrated organic viscosifiers formed with guars, HEC and the like are subject to microbial attack in storage, which may compromise their shelf life and efficiency. Adding biocides will improve storage characteristics but the added toxicants will limit their use especially in water well drilling and additionally compromise the microbial attack desired for the removal of these materials from their sequestered locations in fracture beds. Furthermore many toxicity issues arise with the use of guar and similar organic viscosifiers so they may no longer be discharged offshore and present significant onshore permit, shipping, handling, and disposal problems.

With the present invention, when removal is desired, simply unlinking the strong molecular net breaks and liquefies the gel. The gel forming three-dimensional webs is easily and quickly eradicated by adding the proper ions such as, but not limited to, those of ammonium persulfate or calcium. Uptake of these ions breaks the intermolecular linking and removes the created straightening charges along the long polymer molecules so they virtually instantly separate and again loop to their initial tightly coiled configuration. This abrupt unlinking and balling of the long polymer strings results in instantly breaking of the gel and its liquefaction; the gel producing structures are no longer present.

The strong high carrying capacity of the present gel has lower viscosity yet is quite thermostable; the powerful yet lower viscosity gel tolerates significant temperature increases without failing.

Temperature stability is vital, especially in petroleum drilling where great temperature elevations may be encountered at greater depths. Prior art gels are subject to failure at even mild temperature increases commonly encountered in drilling to any significant depth.

Viscosity/Concentration and temperature tests were performed on the present gel formulation by Mudtech Laboratories, 5310 Milwee, Houston, Tex. 77092. Those tests show the high temperature stability of the gel of the present invention. A 5% gel formulated with the present invention lost less than 20% of its viscosity with more than 100° F. increase in temperature as calibrated on a Brookfield viscometer. Additionally there is less than 50% loss in viscosity even with more than 225° F. of temperature elevation also on a 5% concentration, far better than prior art formulations even when compared to guar and its derivatives.

As discussed above, many toxicity issues arise with the use of guar and similar prior art organic viscosifiers and many may no longer be discharged in the Gulf of Mexico. EPA "Drilling Fluids Toxicity Tests" (Mysidopsis baja) were conducted on a 5% solution of the present invention (the usual maximum necessary concentration), and the breakable gel passed. The tests were conducted by Mudtech Laboratories, 5310 Milwee, Houston, Tex. 77092, according to requirements stipulated in the Federal Register, Vol. 50, No. 165, Aug. 29, 1985 using Sodium Dodecyl Sulfate as a standard reference toxicant.

The present breakable gel also passed "Static Sheen Tests" conducted according to EPA guidelines. Furthermore, EPA Method 1664 "Oil and Grease Content" tests were conducted by the same laboratory on another 5% concentration of the present breakable gel. The results were Non-Detect (the lower detection limit of the EPA Method 1664 is 1.4 mg/L— the sample was below the 1.4 mg/L detection limit.)

Further testing for shale disintegration, linear swelling and capillary suction time were also conducted by Mudtech Laboratories on both 2.5% and 4% solutions of the present breakable gel. The gel at 2.5% in water performed well in all tests. The 4% gel performed well in the linear swelling tests. The gel performed well at 2.5% but a 4% concentration greatly exceeded the required Capillary Suction Time tests. This is a result of the presence of the higher viscosity gel triggering capillary compromise. This is overcome when the present gel is broken. Guars, xanthane, cellulose, and similar viscosifiers, on the other hand, remain occlusive.

The present gel characteristics include ease of handling, increasing ease and rapidity of field mixing with higher source water contamination latitude, high dilution rates, controllable suspension of additives, increased lubricity, and compatibility with drilling, completion, production, and distribution additives. High temperature tolerance, stability under pressure, greatly increased carrying capacity with minimum thickening, increased lubricity and ease of removal are also desirable characteristics exemplified by the present invention. A controllable viscosity breakable gel can also be made using seawater with slight formula modifications thus awarding great savings when used offshore.

The increased carrying capacity of the present gels makes them valuable for use in wells as sweeps and carriers for solid particle proppants such as sand, gravel and other materials that are pumped into wells during drilling, fracturing, completion and production, and to maintain the integrity of hydraulically created fractures in the strata from which oil and gas are produced, yet they are easily removed from fissures produced in the fractured strata and from the voids in the proppant pack by the simple addition of more water containing selected ions that cause the gel to break into free flowing water leaving no residual.

Examples of Methods of Use

The breakable gels of the present invention have great value in pipelines and distribution as carriers for agents used in cleaning, scrubbing, and similar functions as well as for bitumen laden sands, etc. They may be injected as a "gel pill" along with a mechanical pig through pipelines to effect efficient removal of rust and other debris which is dislodged and then suspended within the gel to be efficiently carried away for disposal. The resultant collection is easily broken into a liquid by the addition of any proper ion-containing additive thus providing for easy separation and removal of the carried debris.

The increased carrying capacity of the present breakable gels makes them suitable for use in water and petroleum drilling operations as lubricants and sweeps to support, suspend, and carry drilled spoils out of wells. Upon return of the particle-laden gel to the surface, the gel is easily broken by adding sufficient effective ions, thereby releasing the carried matter. It can often be gelled for reuse by adding sufficient sequestering and gelling agents.

High-rate high-volume water fracturing is now commonly used to avoid complications such as leakoff, toxicity of prior art viscosifiers, and the formation healing difficulties encountered in the removal of the residues from the strata using prior art techniques and formulations. As much as a million gallons of water may be injected at extremely high flow rates and pressures in a matter of minutes, thus fracturing the subterranean strata extensively while at the same time precluding significant leakoff due to the high flow rates and volumes utilized. The increased lubricity inherent in the present invention, sometimes referred to as "slick water," enhances the ability to achieve the high flow rates desired in high-volume-high-pressure "water fracks" where water alone is the fractioning agent and no proppants or other materials are to be carried.

Incorporating the components of the present invention into a carrier-slurry allows the formulation of high bulk density products which can greatly decrease the volumes of the light active ingredients required at the well location. Since lightness of the active ingredients is reflected in particle size distribution, agglomeration of the finer grains with small amounts of products liquid polymer suspensions of, such as but not limited to, cellulose compounds, which eliminates many of the problems associated therewith. By complexing the materials, the relative surface area of each grain is decreased while ease of dissolution is maintained when the agglomerated mass breaks up.

Efficient fracturing with a small percentage of the same volume of fracturing fluids can be accomplished by injecting properly viscosified fracturing gels that can be easily and efficiently removed from the strata without leaving toxic or occlusive residues. This can be accomplished while at the same time often completely avoiding many of the complications associated with environmental impact of the discharge including the well's site-specific discharge costs and risks associated with handling and transporting fluids.

When used as part of the completion process, the higher carrying and support capacity of the gel of the present invention empowers higher particle carrying capacity with far less viscosity and fluid volume than currently available products.

In drilling operations these qualities virtually eliminate the formation of occlusive proppant dunes ("screen-out") that may result within formations when suspended proppants prematurely fall out of injected fracture media. Yet the "molecular-lattice" formed gel of the present invention is disintegrated by the prior injection of a desired ion containing fluid mixture, the presence of the necessary ions within the strata, a subsequent injection and/or simultaneous injection of such ions or other chemicals such as ammonium persulfate so the gel liquefies in place. The liquefied gel is then free flowing leaving no residue in the openings created in hydraulically produced fractures or the voids between the placed proppants or in the subterranean strata. This may be accomplished in offshore well drilling by formulating the fracture gel with fresh water and following with sea water as the gel-breaker. There is no necessity to repeatedly wash or flush the established openings. Upon contact with the proper ions the carrier liquefies leaving no occluding residue.

Although strata are commonly composed of sufficient gel breaking ions, one method of use during well completion operations to assure complete gel breakdown is the prior injection of the proper ion-containing liquids which initiate fracturing of the strata thus assuring the presence of carrier-breaking ions in the far reaches of the strata fractures. The initial injection of such ion containing fluid will begin initial fracturing of the strata. A following fresh water plug injected through the system to decrease the presence of carrier breaking ions in the system averts premature gel liquefaction and complications such as proppant dune formation or screen-out. Subsequent injection of the breakable gel carrier described in this invention carrying the desired proppants will further open and extend the fractures as well as forming peripheral leakoff control thus assuring maximum fracture extension. As the gelled proppant slurry courses through the opening fractures, the proppants pack along and in the opening pathways. This holds the fractured fissures open thus assuring flow (and backflow upon breaking).

In fracturing, the core of the proppant slurry flows through the fissure centers even as the periphery of the flow becomes static, thereby efficiently carrying the centrally transported proppants to the most distant fringes of the fracture bed. As the outer boundaries of the gel slurry eventually contact the breaker material, such as ammonium persulfate or cations, the gel carrier breaks into a free flowing liquid thereby losing its capacity to efficiently carry the solid particle proppants. Proppant deposition therefore occurs sequentially along the opening fissures. The packed solid particles are effectively released from the peripheral free flowing liquid that results as the carrier gel breaks. When the gel breaks and liquefaction occurs, the high carrying capacity of the cross-linked gel slurry is replaced by a low carrying capacity liquid backwash. As the pressures drop resulting in a backflow producing a mixture of the gel carrier with the returning ions, the gel breaks so there are minimal backwash pressures on the packed proppants; the injected solids readily remain in place.

Another method of assuring the timely presence of gel-breaking molecules is to add them as a part of the initial fractioning fluid but adding them in a form that provides for delayed activity and therefore delayed gel breaking. Ammonium salts such as, but not limited to, ammonium chloride and ammonium persulfate are efficient. Various complexed combinations of ammonium salts and bi- and multi-valent cations are useful and efficient breakers.

Though not usually necessary, chemicals such as polyethylene glycols (PEGs) of different molecular weights may be used for breaker encapsulation thereby providing for preferred breaking delay. The lighter liquid PEG chains, the more rapid the carried breaker will be released. The breaking temperature can be set as desired, usually less than 170 degrees F., by varying the percentages of the assorted PEGs used Heavier PEG chains that are solids at room temperature are preferred for chain length determines melting point and subsequent liquefying of the encapsulating PEG allows release of the carried breaker. To formulate the carrier complex, the desired combination of solid PEGs is heated past the melting point and the desired breaking chemicals added to the liquefied PEG. The resultant breaker-loaded liquid is then preferably prilled to make granular prills which are easily metered into the drill stream using existing equipment. These coagulated prills, commonly about one millimeter in diameter, hold the carried breaker until these prills are heated by the downhole temperatures sufficiently to disintegrate which releases the carried breaker thereby triggering liquefaction of the gel.

The gel characteristics of the present invention provide for pad formation to control leakoff in high permeability sands as well as a high capacity to carry the proppants. The proppant slurry is carried to the far reaches of the fracture as leakoff is controlled resulting in screenout at the fracture tips therefore maximum proppant packing. The initial injection fractures the formation and provides some sealing of the walls of the fracture thus lengthening the fracture bed. This may be done by injecting a more concentrated formulation of the gel. Gel or polymer pills of over 80 to 100/bbl are the most common fluid loss control method but are frequently the most damaging event of the completion process. This is because of the difficulty in later removing the viscosified material. With the present invention formation healing is assured by injecting the proper ions which will break the polymer carrier whether injected or formed in place thereby enhancing its easy removal.

The time required for the solid particles to settle from a carrier is dependent on the terminal settling velocity of the particles in their immediate surroundings and the distance the particles must fall. For example, 20-40 mesh sand has a terminal settling velocity of about ⅓ foot per second in water. The settling velocity of the gravel or sand in the gel of the present invention can be as low as zero over days depending on the gel formulation and concentration used; yet it is breakable as desired.

With prior art technologies, it is difficult to suspend even five pounds of sand per gallon of carrier and still produce a mix of low enough viscosity to efficiently pump. The current invention's carrying capacity exceeds 10 to 15 pounds per gallon while retaining excellent pumping characteristics and overall lubricity. Therefore, in well fracturing, larger quantities solid particle proppants can be effectively and sequentially deposited throughout the pathways created, yet still be carried to the far extremes of the created fractures. Upon cessation of the pumping, when the high velocity, high carrying-capacity gelled carrier movement ceases, surrounding or injected ions act to break the carrier; solid particles are released from suspension. The return particle movement capacity dramatically decreases in the then liquid carrier. Though not ordinarily necessary due to the presence of sufficient ions in subterranean structures, if indicated, additional ion or ammonium persulfate containing water may be pumped in to assure complete breakdown of the gelled carrier. Offshore, seawater usually carries enough bi- and multivalent gel breaking ions so it can be used as a breaking solution if freshwater was used in the original gel formulation.

When the present invention is used as a fracturing agent carrier, no flushing or recovery of the carrier is required for it contains no compromising matter such as guars, cellulose compounds, fibrous mixtures, tackifying materials or similar organics. It completely liquefies downhole if the proper ions are present or injected. Because the gel consists of such a small percentage of active ingredients that additionally are soluble after breaking, there is no residual carrier occlusion of the strata.

The same principle is easily applied to pipeline distribution of slurries of all kinds; the desired matter is easily transported to the desired location and then simply and efficiently separated from the carrier by the addition of the gel breaking ions.

The detailed embodiments of the gelled carrier compositions and methods using the variable viscosity breakable gel formulations disclosed herein are provided for illustrative purposes only and are not to be construed as limiting the scope of this invention. Many variations and applications, which do not depart from the scope and spirit of the present invention, will be apparent to those skilled in the art. All such modifications are within the intended scope of this invention. Changes may be made in details, particularly in sequence or addition of other constituents, without exceeding the scope of the invention. While this invention has been described fully and completely with special emphasis upon preferred embodiments, it should be understood that within the scope of the appended claims the invention may be practiced otherwise than as specifically described herein.

The invention claimed is:

1. A variable viscosity high carrying capacity temperature-stable breakable gel with high-temperature stability for use as a lubricant and carrier of solids, particulate matter, semi-solids, proppants, and liquids into subterranean well formations, comprising:
    a first or base concentrate comprising:
        a mixture of from about 80% to about 91.8% by weight of a buffered water solution containing acidic and alkaline ions and having a pH above about pH 3, and from about 0.4% to about 16.24% of a polyacrylate; and
    a second or activator solution containing a mixture of water, an amine cross-linking agent, and a nonionic surfactant;
    said first or base concentrate and said second or activator solution being mixed together in a ratio of from about 93% to about 99.95% by weight of said first or base concentrate to about 0.05% to about 7% by weight of said second or activator solution to raise the pH of said first or base solution and instantaneously trigger formation of a high carrying capacity temperature-stable breakable gel having high-temperature stability and lubricating characteristics and a viscosity sufficient to support, suspend, and carry solids, particulate matter, semi-solids, proppants, and liquids therein into subterranean a well formation during drilling, fracturing, completion and production operations.

2. The variable viscosity high carrying capacity temperature-stable breakable gel according to claim 1, wherein
    said buffered water solution of said first or base concentrate is derived from a source water of indeterminate pH by adding from about 0.1% to about 4.25% by weight of an acid to said source water to lower the pH of said water below about pH 2 and form an acid/water mixture; and
    adding from about 0.3% to about 0.8% by weight of an alkaline electrolyte to raise the pH of said water/acid mixture above about pH 3 and form said buffered water solution.

3. The variable viscosity high carrying capacity temperature-stable breakable gel according to claim 2, wherein
    said acid comprises about 0.2% by weight to lower the pH of said source water below about pH 2; and
    said alkaline electrolyte of said first or base concentrate comprises about 0.8% by weight to raise the pH of said water/acid mixture and form said buffered water solution containing acidic and alkaline ions and having a pH above about pH 3.

4. The high carrying capacity temperature-stable breakable gel according to claim 3, wherein
    said acid is an organic acid.

5. The high carrying capacity temperature-stable breakable gel according to claim 4, wherein
    said organic acid is a carboxylic acid.

6. The high carrying capacity temperature-stable breakable gel according to claim 3, wherein
    said acid is an inorganic acid.

7. The high carrying capacity temperature-stable breakable gel according to claim 6, wherein
    said inorganic acid is hydrochloric acid.

8. The high carrying capacity temperature-stable breakable gel according to claim 1, wherein
    said second or activator solution comprises a mixture of:
    about 40% to about 100% by weight of said water;
    about 0.1% to about 55% by weight of said amine cross-linking agent; and
    about 6.5% by weight of said nonionic surfactant.

9. The high carrying capacity temperature-stable breakable gel according to claim 1, wherein
    said amine cross-linking agent of said second or activator solution is diisopropanolamine.

10. The high carrying capacity temperature-stable breakable gel according to claim 1, further comprising:
    a third or breaker material selected from the group consisting of dry cations, aqueous cation solutions, ammonium persulfate, calcium chloride, sodium chloride, and potassium chloride, which when applied to said gel breaks said gel into a free flowing liquid thereby releasing the supported, suspended, and carried solids, particulate matter, semi-solids, proppants, and liquids therefrom to maintain the integrity of fractures in the subterranean well formation strata.

11. The high carrying capacity temperature-stable breakable gel according to claim 10, wherein
    said third or breaker material is ammonium persulfate.

* * * * *